2,901,447

RUBBER-REACTIVE PIGMENT AND DRYING OIL PROTECTIVE COATING COMPOSITIONS

Walter E. Lox, Minneapolis, Minn., assignor to Forman, Ford & Company, Minneapolis, Minn., a corporation of Minnesota No Drawing. Application August 31, 1955
Serial No. 531,838

8 Claims. (Cl. 260—3)

My invention relates to novel and improved protective coatings and the methods of producing these protective coatings. In particular, my invention relates to a novel and improved elastomer composition or rubber resin and the method of preparation thereof by the treatment of various natural and synthetic rubbers with hydrocarbons and reactive pigments. This elastomer composition in itself may be useful as a protective coating; but in addition, it is compatible and freely soluble with all alkyd and oleoresinous paint systems, and with latex paint systems if first emulsified. My invention, thus, further relates to protective coatings incorporating my elastomer composition, and the method of producing the same.

My invention particularly relates to the formation of elastomeric or rubber protective coatings which are cheaper, more easily applied, and in particular which are more easily and more effectively sprayable than any rubber paint products now known. Rubber paint products now generally known, not including the latex emulsion paints wherein the latex component has been altered so that it is not rubber even though it is like rubber, use chlorinated rubbers. The chlorinated rubber paint products are limited in the solvents usable therewith, are not particularly applicable for spraying, and may have a substantial toxic effect upon the applicator.

It is an important feature of my invention that my elastomer composition, unlike the chlorinated rubbers, may be incorporated in a protective coating with any hydrocarbon solvent and is compatible with a wide variety of resins, whereby to provide a wide variety of elastomeric protective coatings which have a highly desirable solvent balance and release.

I start with any rubber, natural or synthetic, or any combination of rubbers. Preferably, I have used rubbers which generally are copolymers of butadiene and styrene or copolymers of butadiene and acrylonitrile. It is to be noted that by subsequent reference to rubber or rubbers, in the specification and claims of this application, I am referring to any natural or synthetic rubber now known or its equivalent. The rubber starting product is combined with a small amount of oil or resin and a reactive pigment or pigments. This combination of rubber, oil and reactive pigment is then milled to form a plastic material of true rubber-like consistency. In the milling of the rubber, oil and reactive pigment or pigments, it is believed that a stereochemical change takes place wherein a cis-trans isomerization occurs or is effected.

It is my conclusion that any of the numerous drying oils, either natural or synthetic, or any of the resin binding mediums or vehicles, natural or synthetic, may be combined with the starting rubber product with the exception of a binding medium containing any of the styrenated alkyds or epoxy resins; and hereinafter, in the specification and claims, I shall generally refer to this element or component of my invention only as "oil," although it is understood that by the use of such term I am referring to any oil, resin or varnish protective coating binding medium with the exception of the styrenated alkyds and epoxy resins as aforementioned.

The specific oil combined with the starting rubber product may depend upon the particular function for which my elastomer composition is intended or upon the characteristics of the finished protective coating desired. The only specific restriction is that if my elastomer composition is to be incorporated in a paint system, the formula of which calls for a certain oil or resin or combination thereof, the oil combined with the rubber starting product must be compatible with the other oils and/or resins of the paint system.

I have used many of the natural drying oils, including caster oil, tung or China-wood oil, linseed oils, and combinations thereof, and the alkyd resins. The oil which I have primarily used has been a heat-reacted linseed oil. I have found that if dehydrated castor oil (DCO) is used with the starting rubber product that my novel and improved elastomer composition gives a maximum adhesion to a bare metal.

To be more specific with respect to the quantity of oil used, I have found that generally two pounds of oil for every nine pounds of rubber is most suitable. If one uses a heavy-bodied oil, larger quantities thereof may be needed than if one uses a less viscous oil. The quantity of oil is not highly critical and the amount may vary between eighteen and twenty-eight pounds for every one hundred pounds of starting rubber.

With respect to the reactive pigments added to the starting rubber product, zinc oxide is generally the preferred reactive pigment in that cost-wise it is less expensive, and it produces a uniform rate of cure of the rubber which will keep pace with the drying of the resinous film-forming materials included in the formulation and so produces a smooth, even, continuous film. I have found that for most applications of my invention, in the preparation of various protective coatings, that it is preferable to use three pigments; zinc oxide, calcium carbonate and magnesium silicate. The quantity of these pigments will vary depending upon the particular application or use of my elastomer composition as will be subsequently brought out. It might be mentioned, however, that the total quantity of pigment added to the rubber starting product is limited by the ease of handling the mixture of rubber, oil and pigment. If too much pigment is added to the rubber, the consistency of the mixture would become too hard for proper handling.

Further experimentation with my invention may result in various pigment combinations and proportions which are found to be desirable or suitable for a specific application; and I do not wish in any way to be limited to any specific pigment combinations or proportions which are added to the rubber starting product.

In the next step, in the formation of my novel and improved elastomer composition, the plastic material, which is formed by milling the combined rubber, oil and pigment, is cut back with two volatile solvents, one having a relatively high kauri-butanol solvent value and the other having a relatively low kauri-butanol value. I have found that the two preferred thinners or solvents to be used are xylene and mineral spirits; and the preferred proportions by weight of solvents to the rubber is approximately one part of xylene, two parts mineral spirits and two and one-half parts of the plastic material. This cut-back is preferably accomplished by adding to the two and one-half parts of the plastic material, first, the one part of mineral spirits, and then the one part of xylene, and finally the remaining one part of mineral spirits. I have found that the aforementioned proportions are somewhat critical, in the formation of a preferred product of my invention, and that a variance of greater than five percent will produce an elastomer composition which does not have the desired qualities. With respect to the xylene, I use the commercial xylene known as xylol.

With respect to the cut back of the plastic material, two specific exceptions should be noted.

First, in the formation of an elastomeric roofing compound by the principles of my invention, as will be brought out more specifically subsequently, the usual cut back procedures of the plastic material do not need to be followed, and any hydrocarbon solvent may be used to effect application viscosity of the roofing compound.

Second, in the emulsification of my elastomer composition, wherein it is adapted for use in water-thinned coatings, as will be brought out more specifically subsequently, the solvent combination in the cut back procedure is changed; and a hydrocarbon solvent or solvents with a slower evaporation rate than water is used. This modification, in the preparation of the elastomer composition, insures that the solvent is the last component to evaporate and thereby welds the rubber and modifying resins, if any, into a continuous film. Water soluble solvents such as ketones and esters should not be used.

My novel and improved elastomer composition may prove to have innumerable uses and applications. The elastomer composition by itself is an effective protective coating in that it is adhesive to all types of material, including cleaned or uncleaned metals, and it forms an effective vapor barrier and it produces a film of sufficient hardness to promote effective priming of the material. It must be noted that the statement "cleaned or uncleaned" is in reference to oxidized metal material and not oils or greases which must be washed off. As the elastomer composition contains oil and pigment, it will be relatively slow drying in its own right, and the usual driers and additives are generally combined with the elastomer composition in order to promote rapid and even drying thereof.

I have coated paper with my elastomer composition, and then treated it with heat; and thereby formed a rubber-coated paper having many desirable characteristics.

My elastomer composition has been combined with carbon black, sulphur and accelerators to produce a protective roof coating which is cheaper than any roof coating now known. Preferably, the carbon black, sulphur and accelerators are integrated with my elastomer composition prior to the actual formation thereof so that these components are thoroughly dispersed during the milling of the rubber, oil and pigment, in which case, the sulphur and the accelerators act as the reactive components with the rubber and oil, and reactive pigment such as zinc oxide, calcium carbonate or magnesium silicate need not be included; however, the carbon black, sulphur and accelerators might be combined with an already-formed elastomer composition, and then the conglomerate would then be milled to insure a thorough dispersion of all the components. I have used carbon black of a very fine grade and two suitable types are known commercially as Carbolac No. 1 and Carbolac No. 2, which have a particle size below one micron and are, I believe, approximately one-half micron. In an area having a high humidity, a larger amount of carbon black will be used in proportion to the other components than in a dry area. A specific example of a formulation of my novel and improved roof coating composition will be given subsequently together with a group of other specific examples of various protective coatings.

A particular characteristic of my novel and improved elastomer composition is that it has been found to be freely soluble and compatible with all alkyd and oleo-resinous paint systems, and with latex paint systems if first emulsified. My elastomer composition may be incorporated as a constituent part of a varnish or incorporated in pigmented paint systems to provide a wide variety of new and improved protective coatings.

A further aspect of my invention is that the incorporation of my elastomer composition in a paint formulation with a phenolic resin and a catalyst has resulted in an entirely new product, new to such an extent that thus far it has defied chemical analysis using the usual techniques and procedures of rubber technology. The material formed has stereo-chemical properties unlike that of any rubber material now known, and the film resulting from the surface oxidation and solvent release has the inherent qualities of rubber, i.e., elasticity, chemical inertness, resistance to abrasion, and resistance to hydrostatic pressure. A microscopic examination has revealed that the film is continuous; and when pigmented films were examined microscopically, it was shown that dispersion was complete in all respects so that it would seem that rubber, pigment and oils have combined chemically to give an integral film union.

In the usual practice of paint formulation, the process generally comprises three stages: first, the mixing stage, wherein the pigments and binding medium or vehicle comprising the various oils and/or resins, and perhaps some volatile solvent, are mixed to make a paste suitable for milling; second, the milling stage; and third, the "let down" stage, wherein the driers, additives and volatile solvent are added. It is generally known in the paint industry that the specific pigment combinations and proportions and binding medium combinations and proportions in any protective coating formulation depend upon the particular application or use of the protective coating. It would be impractical to attempt to set forth all possible specific paint formulations in which my elastomer composition might be used; however, a few specific examples will be described subsequently.

One skilled in the art may be able to incorporate my novel and improved elastomer in any specific paint formulation to produce a product within my new family of protective coatings, which have as yet, as aforementioned, defied analysis, by knowing; first, that it may be substituted approximately pound for pound for any resin binding medium now used in the various paint systems; and second, it should be incorporated in such paint systems at the mixing stage thereof together with a phenolic resin and a catalyst. Preferably, I have used a phenolic resin, which is obtainable commercially known as Bakelite BR 9400 and, a 100% oil soluble phenolic resin, comprising a combination of paraphenylphenol, paratertiary butylphenol and bisphenol A. The particular catalyst which I have found to be suitable is abietic acid. This catalyst may be used in the form of rosin, which is much cheaper than pure abietic acid; and I have actually used, in the practice of my invention, limed rosin.

In the formulations and description, the expression "pure phenolics" has been used. While this expression is used by the art, as shown by "Organic Coating Technology" by Payne, published by John Wiley and Sons, volume 1, copyright 1954, pages 170–175 with special reference to page 175, and "Varnish Constituents" by Chatfield, 3rd edition, published by Leonard Hill, London, England (1953), pages 294, 295 and 773, this expression (pure phenolics) is open to some confusion. As shown by Payne on page 175, Table 13 BR 9400, the resin used by applicant, is described as, heat non reactive, on page 173 as non reactive, oil soluble, 100% phenolic, and on page 170, that these resins are phenol-formaldehyde resins. To the same effect is Chatfield on page 295 that oil soluble resins are of the phenol-formaldehyde type and on page 773 that BR 9400 is a 100% phenolic oil soluble non heat reactive resin. From the above citation from the publications it is established that the art recognizes this type resin as: oil soluble heat non reactive 100% phenol formaldehyde resins in the interest of clarity, this terminology will be employed in the claims.

Generally, a protective coating formulation is based upon the production of 100 gallons of a finished product. I have found that an approximate minimum of fifty pounds of phenolic resin is required for 100 gallons of a finished protective coating. This quantity may be increased, depending upon the characteristics of the finished protective coating, which will be subsequently mentioned. I have found that for 100 gallons of a high gloss protective coating, an approximate minimum of thirty pounds of limed rosin is required; but for other finishes, ten pounds of limed rosin would be the approximate requirement.

Rosin is a brittle and hard resin which will provide the same characteristics to a paint film, in varying degrees depending upon the amount of rosin incorporated in the paint. It is for this reason that smaller amounts of rosin are used in protective coating formulations providing for a dull finish but that a larger amount is used in protective coating formulations for providing a high gloss finish. If pure abietic acid were used instead of rosin, the brittleness and hardness of the finish desired would not be a factor in determining the amount of catalyst used; however, since rosin is so much more easily available than pure abietic acid, it would generally be used rather than the latter. It will be understood by one skilled in the art that the quantity of rosin used in a paint formulation will effect the characteristics of the paint film and must be taken into consideration.

I have found that for high gloss protective coatings that a maximum of one and one-half pounds of my elastomer composition per gallon of finished protective coating is preferable, which would mean 150 pounds of elastomer in a 100 gallon formulation. Since my elastomer is cheaper than any other known resin vehicle, I will generally substitute in all paint formulations at least 150 pounds of my elastomer composition for substantially 150 pounds of the resin vehicle in the formulation. However, there is no restriction on the amount of my elastomer composition preferred for dull finishes, and it can be used alone or in combination with other resins, depending upon what characteristics are desired in the protective coating product.

Although this will be obvious to one skilled in paint formulation, it should be noted that the amount of oil and quantity of reactive pigment added to the starting rubber product to form the rubber-like plastic material, which is then cut back to form my elastomer composition, must be taken into account with respect to the quantity of pigment and resin combined at the mixing stage in the production of the protective coating so that the total quantity of resin and pigment are in proper proportion to produce a final paint product of the desired characteristics.

Enlarging further with respect to the reactive pigments added to the starting rubber product, most protective coatings require a minimum of ten pounds of zinc oxide for each 100 gallons of finished product. It is clear that outdoor house paint would require a great deal more than this minimum. Generally, however, the pigment added to the rubber starting product contains a minimum of ten pounds of zinc oxide and that quantity may be increased, depending upon the particular application of the protective coating. In this respect one specific exception should be noted with respect to the formulation of a glossy white baking enamel wherein a minimum of zinc oxide is generally preferred. In the formulation of such a paint, I would combine approximately five pounds of zinc oxide with the rubber starting product for each 100 gallon formulation, and additional zinc would be added to the slurry, at the aforementioned mixing stage in the process, in the form of zinc napthanate.

In addition to the zinc oxide I generally include some extender pigments with the rubber starting product. I have found that if calcium carbonate and magnesium silicate are used in the paint formulation, that approximately one pound of each is necessary in the production of 100 gallons of finished product to preserve the film integrity. I have also found for sprayability of a protective coating in which my elastomer composition has been incorporated with a phenolic resin and rosin catalyst, that the reactive pigment combined with the starting rubber should comprise not only the zinc oxide but should essentially include some calcium carbonate and magnesium silicate. It is my conclusion that coarser pigments may be substituted for the calcium carbonate and magnesium silicate if the finished protective coating is to be applied by electrostatic spraying, dipping, brushing, or in the case of the production of a sprayable traffic paint.

To draw together some of the aforementioned facts regarding my invention, and to set forth basically the steps of my invention wherein my novel and improved elastomer is incorporated in a paint form relationship to provide a new paint product, the following steps should be noted, although they are somewhat repetitious.

After the elastomer composition has been formed, as aforementioned, that is by cutting back the milled mixture of rubber, oil and pigment with the two hydrocarbon solvents which are preferably xylene and mineral spirits, it is combined with a phenolic resin and abietic acid catalyst and incorporated in a paint system at the mixing stage thereof. Specifically, I combine pigment, the quantity and type of which depends upon the finished product and use therefor and intensity of color desired; my elastomer composition; phenolic resin; catalyst; and in most instances, additional resin binding medium; and perhaps some volatile solvent if required to make the slurry into a millable consistency. Next, the conglomerate or slurry is milled. It has been found that if this conglomerate or slurry is milled by a roller mill, sufficient heat is created to effect a suspension copolymerization of the conglomerate. By this suspension copolymerization, it would seem that the elastomer composition, pigment and oils of the conglomerate have combined chemically wherein the protective coating upon drying has an integral film union. It should be noted here that the quantity of phenolic resin put into the slurry may be varied from the minimum requirement aforementioned to effect a more or less degree of copolymerization. It might also be noted that the rate or extent of copolymerization might be increased by using heated rollers; or milling might be accomplished by other than a roller mill, if heat is applied, in some manner, during milling to effect the suspension copolymerization. Next, the milled slurry is treated in the usual manner of paint production wherein driers, additives and a volatile solvent are added. It should be noted that if the finished product is a baking enamel, driers and additives may not be added, or that if the finished product is a water-base paint, the slurry must be emulsified prior to the addition of the water solvent. And further, it should be noted that if the finished product is a traffic marking paint that transparent glass beads could be added together with an element for stabilizing the suspension of the glass beads.

It should be noted that my elastomer composition might be used in the formation of a permeable breather-type paint, wherein, by a process of osmosis, vapor passes through the membrane prior to reaching dew point, instead of a vapor barrier paint. The production of a breather-type paint, which produces a colloidal membrane, is generally dependent upon varying the particle size of the extender pigments with special attention to irregularities of crystalline formation thereof. The differences in a formulation of a breather-type paint using my novel and improved elastomer composition or rubber resin from the formulation of the usual, now known, breather-type paints would be, primarily, in the addition of my elastomer composition, phenolic resin and rosin catalyst to the formulation, and in varying the particle size of the extender pigments used in the formulation of the elastomer composition with special attention to the irregularities of crystalline formation of these extender pigments.

Following are six illustrative examples of my invention; Examples 1–4 set forth specific formulations for the production of a 100 gallon batch of the identified paint compositions, Example 5 sets forth a specific formulation of my elastomeric roofing compound, and Example 6 sets forth the preparation of an emulsion of my elastomer.

Elastomer composition hereinafter used in the following examples is the elastomer composition of my invention hereinbefore more fully described.

EXAMPLE 1

Green floor enamel

| | Pounds |
|---|---|
| Chrome green | 100 |
| Yellow iron oxide | 10 |
| Whiting | 50 |
| Soya lecithin | 5 |
| BR 9400 phenolic varnish | 75 |
| Elastomer composition | 150 |
| Limed rosin | 30 |

Grind on 3-roll mill to N.S. fineness of 6. Add—

| | Pounds |
|---|---|
| Linseed-China-wood-tung varnish | 400 |
| Cobalt napthenate | 2½ |
| Lead napthenate | 5 |
| Anti-skinning agent | 1 |
| Wt./gal. | 8.8 |
| Viscosity Krebs-Stormer units | 75 |

EXAMPLE 2

Yellow zinc chromate primer

| | Pounds |
|---|---|
| Zinc chromate | 270 |
| Zinc oxide | 95 |
| Titanium calcium | 75 |
| Magnesium silicate | 75 |
| Aluminum stearate | 6 |
| Bakelite (BR 9400) 30 gallon (pure phenolic) length | 50 |
| Castor-linseed alkyd, 50% non-volatile | 200 |
| Limed rosin | 10 |
| Elastomer composition | 150 |

Grind on a 3-roll mill to a N.S. fineness of 5. Add—

| | Pounds |
|---|---|
| BR 9400 | 65 |
| Mineral spirits | 135 |
| Cobalt napthenate | 1 |
| Calcium napthenate | 1 |
| Lead napthenate | 15 |
| Anti-skinning agent | 1 |
| Wt./gal. | 11.00 |
| Viscosity Thin 4–1 with V.M.P. | 19 seconds |

EXAMPLE 3

Red implement enamel

| | Pounds |
|---|---|
| Para red | 80 |
| Aluminum stearate | 6 |
| Limed rosin | 30 |
| BR 9400 (phenolic) | 50 |
| Elastomer composition | 150 |

Grind on a 3-roll mill to N.S. fineness of 7. Add—

| | Pounds |
|---|---|
| Linseed alkyd | 205 |
| Castor alkyd | 200 |
| Phenolic varnish | 155 |
| V.M. & P. naptha | 100 |
| Cobalt napthenate | 2 |
| Lead napthenate | 4 |
| Anti-skinning agent | 1 |
| Wt./gal. | 8.1 |
| Viscosity Thin 4–1 with V.M.P. | 18 seconds |

EXAMPLE 4

Refrigerator car yellow enamel

| | Pounds |
|---|---|
| Medium chrome yellow | 150 |
| Zinc oxide | 30 |
| Molybdate orange | 40 |
| Aluminum stearate | 6 |
| Limed rosin | 30 |
| Phenolic varnish | 50 |
| Soya-linseed alkyd | 50 |
| Elastomer composition | 150 |

Grind on 3-roll mill to N.S. fineness of 7. Add—

| | Pounds |
|---|---|
| Soya-linseed alkyd | 155 |
| Castor-linseed alkyd | 200 |
| Phenolic varnish | 105 |
| V.M. & P. Naphtha | 100 |
| Cobalt naphthenate | 2 |
| Lead naphthenate | 4 |
| Anto-skinning agent | 1½ |
| Wt./gal. | 9.90 |
| Viscosity Thin 4–1 with V.M.P. | 20 seconds |

EXAMPLE 5

Roofing compound

In the preparation of the roofing compound, it is immaterial whether we start with the rubber as such or the elastomeric compound, as long as we adhere to these proportions:

3% of the rubber—sulphur
20% of the sulphur—accelerator
1% of the sulphur—zimate (ultra accelerator)

A specific example starting with rubber, GR–S:

| | Pounds |
|---|---|
| GR–S | 100 |
| Carbon black (Carbolac #1) | 10 |
| Mineral oil | 20 |
| Sulphur | 3 |
| Accelerator—Mercaptobenzothiazole (Altax) (Captax) | 0.6— |
| Ultra accelerator—Zinc dimethyl dithiocarbamate (Zimate) | 0.006 |

This mixture is then milled on a rubber mill to proper consistency and dispersion. Because the material is not extended for spraying, the usual cutback procedures do not need to be followed and any solvent may be used to effect application viscosity.

For application to paper or textiles, it is recommended that the elastomer composition be used as the starting base as the double milling will result in more effective dispersion and a correspondingly smoother finish, more suitable for knife coating.

At this point it might be well to note that natural rubbers contain variable amounts of fatty acid, the effect of which is not pronounced in the straight rubber-sulphur mixes, but becomes important when the accelerators are used.

The process of vulcanization is not fully understood. It is believed that the sulphur acts upon the double bonds of the rubber molecule so that one double bond is lost for every sulphur atom introduced, to give a three dimensional network linkage responsible for the change in physical properties.

It is known that zinc oxide added to a rubber-sulphur-accelerator mix increases the effectiveness of the accelerators and improves the vulcanization. In this respect, it should be noted that zinc oxide may be a reactive pigment element of my elastomer composition. It is known that with the use of accelerators for faster cure that the fatty acid present in variable amounts in natural rubber, as aforementioned, acts upon the zinc oxide to form rubber soluble zinc salts to effect the improved vulcanization. Therefore, in the use of mixes of natural and synthetic rubbers or synthetic rubbers alone, it would be advantageous to supply the fatty acid in the form of stearic acid in the ratio of 1–5% based on the weight of rubber.

EXAMPLE 6

*Rubber emulsification*

Although at the present writing there have been no large scale production batches of emulsified rubber compound, I can foresee no great technical difficulties in achieving satisfactory results. Laboratory batches have been uniformly good and have shown distinct promise.

In order to prepare an emulsion of the rubber compound or elastomer composition, the solvent combination in the cutback procedure is changed and a solvent or solvents with a slower evaporation rate than water is used. This modification insures that the solvent is the last component to evaporate and thereby welds the rubber and modifying resins, if any, into a continuous film. Water soluble solvents such as ketones and esters should not be used.

The presence of small amounts of divalent and trivalent cations are detrimental to the stability of emulsions. It is therefore best to use either distilled water or deionized water or tap water treated with sodium hexa metal phosphate (calgon) 1 part to 10,000 water.

Most of the well-known emulsifying agents are effective with the rubber compound. Soaps such as ammonium oleate, are especially satisfactory, and form emulsions of exceptional stability.

When ammonium oleate is used as the emulsifying agent, it is not added as such, but ammonium hydroxide is added to the water and oleic acid is added to the rubber. These materials should be added in the ratio of 2.5 parts of oleic acid to 1 part of concentrated ammonium hydroxide (28% $NH_3$). This ratio provides for neutralization of the acid plus an excess of ammonia to insure stability. One to three percent ammonium oleate may be present in the final emulsion.

For most applications equal parts by weight of the water phase (water plus ammonium hydroxide) and the oil phase (rubber plus oleic acid) should be used. To obtain oil in water emulsions that can be diluted with water, the oil phase must be added to the water phase. This is accomplished by stirring the water phase with a high-speed stirrer and then gradually adding the oil phase.

SPECIFIC EXAMPLE

| Water Phase: | Percent by volume |
|---|---|
| Water | 37.2 |
| Concentrated $NH_3OH$ | 0.8 |
| Oil Phase: | |
| Elastomer composition | 30.0 |
| Oleic acid | 2.0 |
| Xylol | 30.0 |
| | 100.0 |

From this point on, the usual procedures in the manufacture of a water-thinned coating may be followed with the usual care to select non-ionic or anionic pigment dispersions.

My invention, as hereinbefore set forth, has been thoroughly tested and practiced to produce the protective coatings or compositions set forth and others, which have proved to be highly successful and commercially desirable. It will be obvious to those skilled in the art that my invention may be modified in many respects; therefore, I intend to be limited solely by the scope of the appended claims.

What I claim is:

1. In the process of preparing an elastomeric composition, the steps of mixing a rubber from the class consisting of natural rubber and copolymers of butadiene and styrene and butadiene and acrylonitrile, drying oil, and reactive pigment in the proportions of about 100 pounds of rubber to about 18–28 pounds of drying oil and at least about 5 pounds reactive pigment; milling said mixture to form a plastic material; and cutting back said plastic material first with mineral spirits, then xylene, and then further mineral spirits; said xylene and mineral spirits and plastic material being in the proportions by weight of about one part xylene and two parts mineral spirits to two and one-half parts of plastic material.

2. The product as formed by the process of claim 1.

3. In the process of preparing an elastomeric composition, the steps of mixing a rubber from the class consisting of natural rubber and copolymers of butadiene and styrene and butadiene and acrylonitrile, drying oil, and pigment including zinc oxide in the proportions of about 100 pounds of rubber to about 18–28 pounds of drying oil and at least about 5 pounds zinc oxide; milling said mixture to form a plastic material; and cutting back about two and one-half parts by weight of said plastic material first with about one part by weight of mineral spirits, then about one part by weight of xylene, and then an additional amount of said mineral spirits in the amount of about one part by weight thereof.

4. The product as formed by the process of claim 3.

5. The process as defined in claim 4 in which said pigment also includes calcium carbonate and magnesium silicate.

6. In the process of the production of a protective coating composition, the steps of mixing a rubber from the class consisting of natural rubber and copolymers of butadiene and styrene and butadiene and acrylonitrile, drying oil, and reactive pigment in the proportions of about 100 pounds of rubber to about 18–28 pounds of drying oil and at least about 5 pounds reactive pigment; milling said mixture to form a plastic material; cutting back said plastic material first with mineral spirits, then xylene, and then further mineral spirits, said xylene and mineral spirits and plastic material being in the proportions by weight of about one part xylene and two parts mineral spirits to two and one-half parts of plastic material; and mixing said cut-back plastic material and an oil soluble heat non-reactive 100% phenol-formaldehyde resin and abietic acid.

7. In the process of the production of a protective coating composition which includes a resinous binding medium, the steps of mixing in a first mixing step a rubber from the class consisting of natural rubber and copolymers of butadiene and styrene and butadiene and acrylonitrile, drying oil compatible with said resinous binding medium, and pigment including zinc oxide in the proportions of about 100 pounds of rubber to about 18–28 pounds of drying oil and at least 5 pounds of zinc oxide; milling said mixture to form a plastic material; cutting back about two and one-half parts by weight of said plastic material first with about one part by weight of mineral spirits, then about one part by weight of xylene, and then with an additional one part by weight of said mineral spirits; mixing in a second mixing step said cut-back plastic material and an oil soluble 100% phenolic resin and limed rosin in the proportions of about 150 pounds of cut-back plastic material, 50 pounds of oil soluble, heat non-reactive 100% phenol-formaldehyde resin and at least about 10 pounds of limed rosin in said second mixing step in the formation of said protective coating composition; and then milling said so produced mixture.

8. The product as formed by the process of claim 7.

(References on following page)

References Cited in the file of this patent

UNITED STATES PATENTS

| | | | |
|---|---|---|---|
| 1,755,890 | Pratt | Apr. 22, | 1930 |
| 1,968,459 | Levin | July 31, | 1934 |
| 2,059,448 | Epstein et al. | Nov. 3, | 1936 |
| 2,164,326 | Harvey | July 4, | 1939 |
| 2,211,048 | Bitterich | Aug. 13, | 1940 |
| 2,410,053 | Drew | Oct. 29, | 1946 |
| 2,442,086 | Huff et al. | May 25, | 1948 |

FOREIGN PATENTS

| | | | |
|---|---|---|---|
| 555,051 | Great Britain | Aug. 3, | 1943 |
| 586,061 | Great Britain | Mar. 5, | 1947 |
| 618,249 | Great Britain | Feb. 18, | 1949 |

OTHER REFERENCES

Factory Manager, Rubber Goods Manuf., p. 88–96, Maclaren & Sons, London (1920), Div. 50. (Copy in Sci. Libr.)

Gardner: Physical and Chemical Examination of Paints, Varnishes, Lacquers and Colors, pages 571 and 573, Institute of Paint and Varnish Research (1939), TP 935 G 35, Div. 60. (Copy in Scientific Library.)

Ludwig et al.: Extenders for GR-S, India Rubber World, p. 731–737, vol. 112 (September 1945). (Copy in Scientific Library.)

Barron (1) Modern Rubber Chemistry, p. 89, 117–128, 161–171, D. Van Nostrand (1948). Copy in Scientific Library, Div. 50.

Barron (2), Modern Synthetic Rubbers, p. 246–259, 413 Chapmen & Hall, London (1949) Division 50. Copy in Scientific Library.

Rostler, Rubber Age—Vol. 69, No. 5, August 1951, pp. 559–575.